US005553006A

United States Patent [19]

Benda

[11] Patent Number: 5,553,006
[45] Date of Patent: Sep. 3, 1996

[54] METHOD AND APPARATUS FOR BUILDING ENVIRONMENTAL COMPLIANCE

[75] Inventor: George Benda, Elk Grove Village, Ill.

[73] Assignee: Chelsea Group Ltd., Itasca, Ill.

[21] Appl. No.: 257,157

[22] Filed: Jun. 9, 1994

[51] Int. Cl.$^6$ .......... G05B 19/02; G06F 17/40; G08B 23/00

[52] U.S. Cl. .......... 364/550; 364/557; 364/558; 364/580; 340/825.06; 340/825.08; 340/870.02

[58] Field of Search .......... 364/493, 550, 364/557, 558, 580, 505; 340/870.02, 825.06, 825.08

[56] References Cited

U.S. PATENT DOCUMENTS

| | | | |
|---|---|---|---|
| 4,090,248 | 5/1978 | Swanson et al. | 364/900 |
| 4,123,796 | 10/1978 | Shih | 364/900 |
| 4,141,006 | 2/1979 | Braxton | 340/505 |
| 4,217,646 | 8/1980 | Caltagirone et al. | 364/493 |
| 4,276,925 | 7/1981 | Palmieri | 165/12 |
| 4,361,832 | 11/1982 | Cole | 340/505 |
| 4,430,828 | 2/1984 | Oglevee et al. | 47/17 |
| 4,497,031 | 1/1985 | Froehling et al. | 364/505 |
| 4,527,247 | 7/1985 | Kaiser et al. | 364/550 |
| 4,567,557 | 1/1986 | Burns | 364/145 |
| 4,602,343 | 7/1986 | Dougherty | 364/505 |
| 4,616,325 | 10/1986 | Heckenbach et al. | 364/505 |
| 4,742,475 | 5/1988 | Kaiser et al. | 364/550 |
| 5,089,974 | 2/1992 | Demeyer et al. | 364/492 |
| 5,103,391 | 4/1992 | Barrett | 364/133 |
| 5,105,366 | 4/1992 | Beckey | 364/505 |
| 5,259,553 | 11/1993 | Shyu | 236/49.3 |
| 5,261,596 | 11/1993 | Tachibana | 236/49.3 |
| 5,262,966 | 11/1993 | Shiihara | 364/551.01 |
| 5,267,897 | 12/1993 | Drees | 454/229 |
| 5,311,451 | 5/1994 | Barrett | 364/550 |
| 5,381,136 | 1/1995 | Powers et al. | 340/539 |
| 5,394,934 | 3/1995 | Rein et al. | 165/16 |

*Primary Examiner*—Emanuel T. Voeltz
*Assistant Examiner*—Hien Vo
*Attorney, Agent, or Firm*—Clifford Kraft

[57] ABSTRACT

A method and apparatus for replacing existing thermostats in buildings with physically small, inexpensive sensor array units that gather local environmental data such as temperature, humidity, carbon dioxide concentration, motion, particulate matter concentration, possibly toxic gas presence, and other parameters. The local arrays report data back over existing building wiring including thermostat wires and building power to a central data logging node. The central data logging node stores and reduces data for reporting over to a computer over a conventional RS-232 link. The data is used to prove compliance with environmental and safety regulations and requirements.

6 Claims, 4 Drawing Sheets

METHOD AND APPARATUS FOR BUILDING ENVIRONMENTAL COMPLIANCE

BACKGROUND

1. Field of the Invention

This invention relates generally to the field of commercial building environmental safety and regulatory compliance and more specifically to data sensing remote units reporting building environmental conditions to a central location for logging and control.

2. Description of the Related Art

Commercial buildings such as office complexes are environmentally controlled by numerous thermostats that either activate local heating and cooling, or report to a central control location. These units, for the most part, do not measure, report, or record local environmental conditions other than temperature. Safety requirements and ever evolving governmental regulations require recording and reporting of localized environmental conditions including temperature, humidity, carbon dioxide level, toxic gases in some locations, particulate counts and other quantities.

Prior art systems exist for closed loop control of some building parameters such as temperature, and remote sensors in these systems are mostly thermostats. These thermostats are mostly bimetal, analog electronic, pneumatic, or digital. None of these systems compile or report localized environmental data for compliance with governmental or safety regulations.

What is badly needed is a remote sensor array that is reasonably priced and physically small that directly replaces existing thermostats in commercial buildings. This array must be able to measure desired parameters, while still performing the function of the thermostat it replaced. In addition, this array must couple into an inter-building communication system comprising existing thermostat wiring or building power wiring. Remote arrays must be placed at numerous locations, and must report data, on command, to a central location where similar data from other parts of the building can be logged, combined, processed, reduced, and stored for further reporting. The central logging system should be able to communicate with each of the local sensor arrays to command data and, in addition, must also be capable of communicating with a computer or telephone line to report data for compliance verification. The central logging system must store data until a local or remote computer requests it. It must be able to take commands from a computer and modify its function on such commands.

SUMMARY OF THE INVENTION

The present invention comprises a method and apparatus for directly replacing local thermostats in commercial buildings with physically small, inexpensive sensor array units. Such arrays measure temperature, humidity, carbon dioxide, motion, particulate matter, and other local parameters in a room. The arrays communicate via an intelligent network to a central data logger on command.

The local arrays are capable of self-calibration, and contain local intelligence that can perform various data reduction, such as sensor linearization and long term averaging of parameters. The arrays are powered either from local supplied thermostat voltage or from building power. Their power is battery backed up to provide reporting capability during power failures or other building emergencies.

Local array units communicate data to a central location via an intelligent data network coupled by existing thermostat wiring, building power wires, or dedicated wiring. In addition any array can communicate with any other array in such a network if necessary as well as with the central location.

A central data node or data logger communicates with all arrays and commands the reporting of data parameters. This node contains a local microprocessor or computer and can perform more advanced data reduction than the remote array units. Such data reduction can be in the form of averages, differences in key parameters, statistical analysis, and other data processing. The reporting rate from different remote units can be different depending on building needs. Reporting rates can be stepped up during building emergencies or slowed for non-occupancy days such as weekends and holidays.

The central logging unit also has the capability to communicate over a standard RS-232 serial data port to a personal computer (PC), modem, or larger computer to report data and take commands. Data is formatted to comply with compliance reporting requirements and is loaded out over this port for printing, storage, or further processing.

BRIEF DESCRIPTION OF THE DRAWINGS

For a more complete understanding of this invention, reference should now be made to the embodiments illustrated in greater detail in the accompanying drawings and described below by way of examples of the invention.

It should be understood, of course, that the invention is not necessarily limited to the particular embodiments illustrated herein.

DESCRIPTION OF PREFERRED EMBODIMENTS

Figure 1:
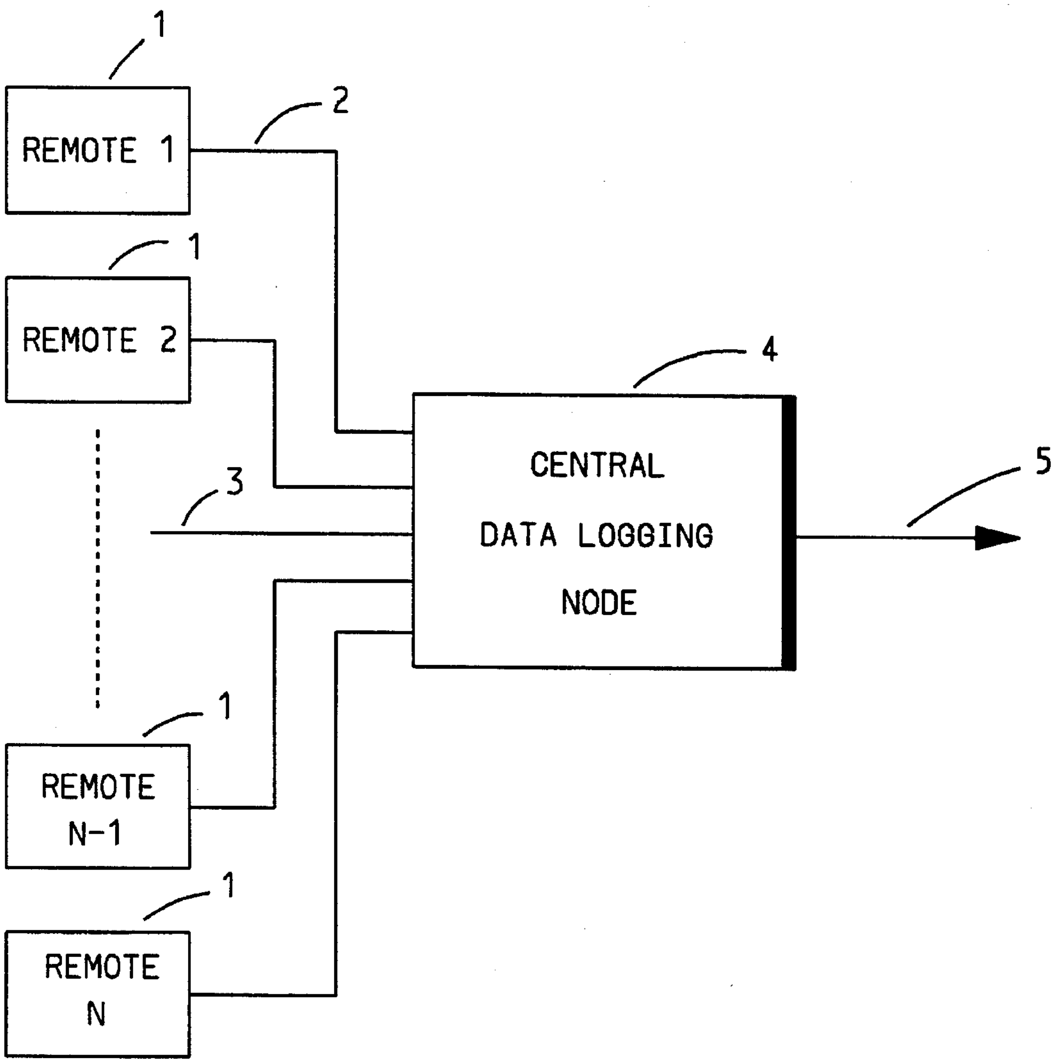
FIG. 1 is an overview of the invention showing remote sensor array nodes and the central data logging node.

FIG. 1 depicts an embodiment of the present invention. Remote units 1 numbered 1, . . . , N are located at various points throughout a building. Each remote 1 communicates over existing media 2 back to a central data logging node 4.

A remote unit 1 contains a plurality of sensors that sense ambient conditions in a given part of the building. Each remote unit 1 replaces a conventional and existing building thermostat or heating/cooling local control unit. There are currently several different types of existing building thermostats. They include 2-wire and 4-wire AC units, digital units, and pneumatic units. The remote unit 1 must be capable of replacing any of these. This could mean that there are several versions of the remote unit 1, each designed to replace a different existing thermostat type.

Most existing building thermostats communicate with a central controller or with building heating and cooling units via twisted pair wiring used only for that purpose. The remote units 1 of the present invention must communicate over that wiring 2 since they replace existing thermostats. In the case of an existing digital or pneumatic thermostat, use of its dedicated wire or tubing is difficult. In this case, the remote unit 1 communicates over building 110 V. power wiring to the central data logging unit 4. If some remote unit 1 is to be located where communication is impossible over existing thermostat wiring or building power wiring, special twisted pair wiring 3 must be used for that remote unit.

The central data logging unit 4 communicates with many remotes 1 over the various communication paths 2, 3, and polls each remote in turn for a report of ambient conditions in its vicinity. The frequency of this polling can be set by an operator; however, since the communications paths are not burdened, it can take place every several minutes. However, the present invention does not demand any particular frequency of data polling, except the minimum that would satisfy safety or regulatory requirements. Thus polling can take place as infrequently as once a day or even once a week. The faster rates of once every several minutes yields sufficient data for establishing trends and averages. Also, different remotes can be polled at different rates if there are requirements to concentrate data gathering in certain parts of the building.

The central data logging node 4 also communicates with a personal computer (PC), other computer, or telephone line and modem over a standard RS-232 port 5. This port can also be used to download commands, change the polling rate, or change the type of data analysis being performed. The RS-232 port 5 is mainly used to upload raw or reduced data for print out of forms certifying compliance.

Figure 2:
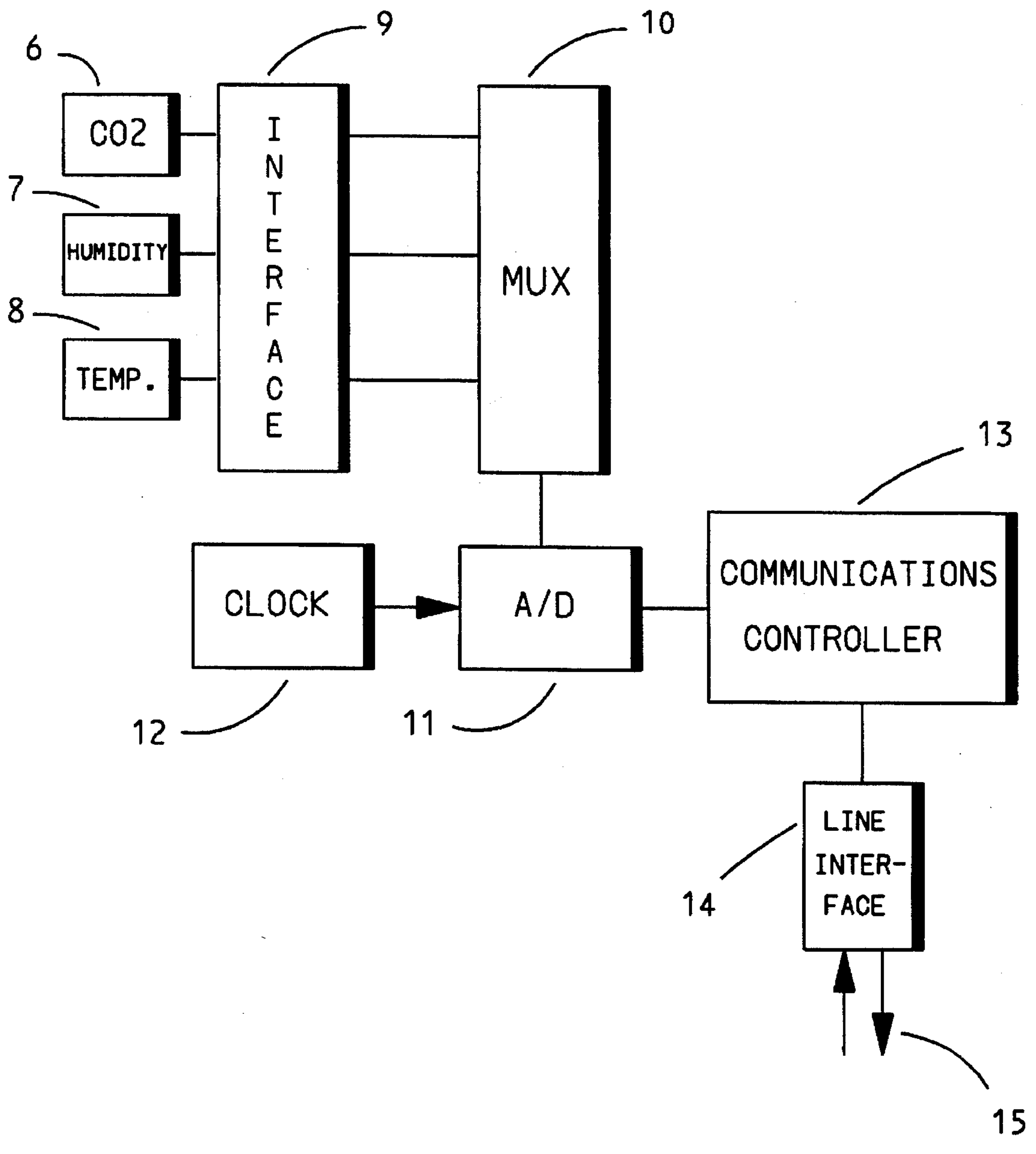
FIG. 2 is a block diagram of a typical remote sensor array node.

FIG. 2 shows a typical remote data collection node 1. In this embodiment, three sensors are shown; however, the invention allows any number of ambient condition sensors to be used including sensors for temperature, humidity, carbon dioxide, toxic gases, particulate count, room population, and many other ambient conditions.

In the embodiment shown in FIG. 2, a carbon dioxide sensor 6 of the type that reports concentrations of between 50–2000 parts per million (PPM) of carbon dioxide in the air is used. This sensor can be a chemical type or an infrared absorption type sensor. A typical sensor might be the 4000/4013 probe made by Solomat of Norwalk, Conn., or the model 1050 nondispersive infrared sensor made by Sensidyne of Clearwater, Fl. Relative humidity (RH) is sensed using a probe 7 similar to the model 358HT made by Solomat reading from 0 to 100% RH. Temperature is measured 8 from below 32 degrees Fahrenheit to over 130 degrees Fahrenheit by an electronic means such as a temperature sensitive amplifier similar to the LM34A made by National Semiconductor or a current source such as LM134 also made by National Semiconductor. Thermistors such as those made by Omega and others may also be used.

Figure 4:
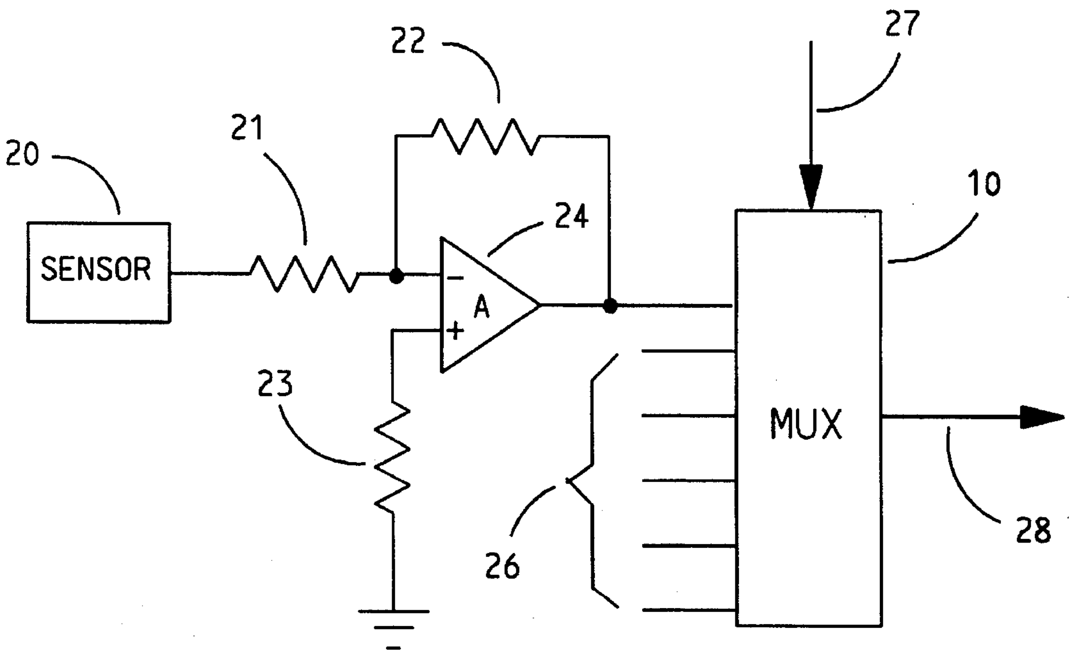
FIG. 4 is a schematic diagram of a typical sensor electronics interface.

Each sensor probe 6, 7, 8 must interface into an electronic signal conditioning circuit 9 to provide the correct signal level to be converted to digital. A typical sensor interface circuit is shown in FIG. 4. Here any of the sensors 20 provides a voltage (or current) to an amplifier 24. The amplifier 24 may be of the inverting (or non-inverting) type where its voltage gain is determined by the ratio of the feedback resistor 22 to the input resistor 21. A bias resistor 23 is provided to minimize offset voltage.

Returning to FIG. 2, the outputs of the interface circuits 9 enter an analog multiplexer 10 well known in the art and then into an analog to digital converter (A/D) 11. The multiplexer 10 and A/D 11 may be separate units, or may be combined in a single silicon chip similar to the model MAX192 made by Maxim Integrated Products. FIG. 4 shows the multiplexer 10 that has several (at least 8) signals 26 entering, and one analog signal 28 exiting to the A/D 11 (FIG. 2). The multiplexer is driven, or selected, by a signal 27 that originates from a local controller (not shown), or from the communications module 13 (FIG. 2).

Returning to FIG. 2, it can be seen that the A/D converter 11 is driven by a clock 12 that controls the convert rate. Since data is sampled at a relatively low rate, the clock need not run at high speed. A speed of several kilohertz can be chosen for convenience; however, many different conversion speeds may be used in the present invention. The A/D converter should provide at least 8 bits, and preferably 10 bits, resolution of the sampled data. The A/D resolution need not be more than the measuring resolution of the most accurate sensor. This is determined by the exact choice of sensors used. Since the present invention allows a wide choice of sensor types, this must be determined after the particular choice of sensor probes is made. However, ten to twelve bit resolution is normally adequate for almost every application of the invention.

The A/D converter 11 supplies data in either parallel or serial form to the communications controller 13. The communications controller 13 can be any form of communications interface, including analog, serial, or parallel digital. A particularly useful communications interface is the family of communications devices made by Echelon Corp. of Palo Alto, Ca. A representative device is the MC143120 manufactured by Motorola Corp. under license from Echelon. Such devices provide a complete communications network throughout the building under control of a single node.

The communications interface 13 couples to a line interface 14 and onto building wiring 15. The present invention comprises different line interfaces based on the type of wiring encountered. Existing 2-wire or 4-wire thermostat lines usually contain 24 VAC as control voltages. In that case, this 60 Hz AC must be blocked from the communications path and a higher frequency signal placed on the pair. In the case of AC building power wiring, the 110 V., 60 Hz must be blocked. In the case of standard thermostat wiring, the signalling can be differential or common mode; for building power, the signalling is usually common mode well known in the art (the communications signal is placed between black/white on one side and green on the other). If special signal pair is used, the signalling is differential mode.

Remote sensor units 1 replace existing thermostats in buildings. It is very desirable for them to take their power from thermostat power sources if possible. In 2-wire and 4-wire systems, 24 VAC is usually available. This can be converted to DC voltages for use in the unit. If such power is not available, building 110 V. power can be used and converted to DC. In addition, it is desirable for remote units to have battery backup in order to continue to function during power outages and building emergencies. Such remote units can quickly report ambient conditions in any room in the building upon request from the central data logging unit 4. Thus, these units become extremely important during building emergencies such as fires, etc.

Figure 3:
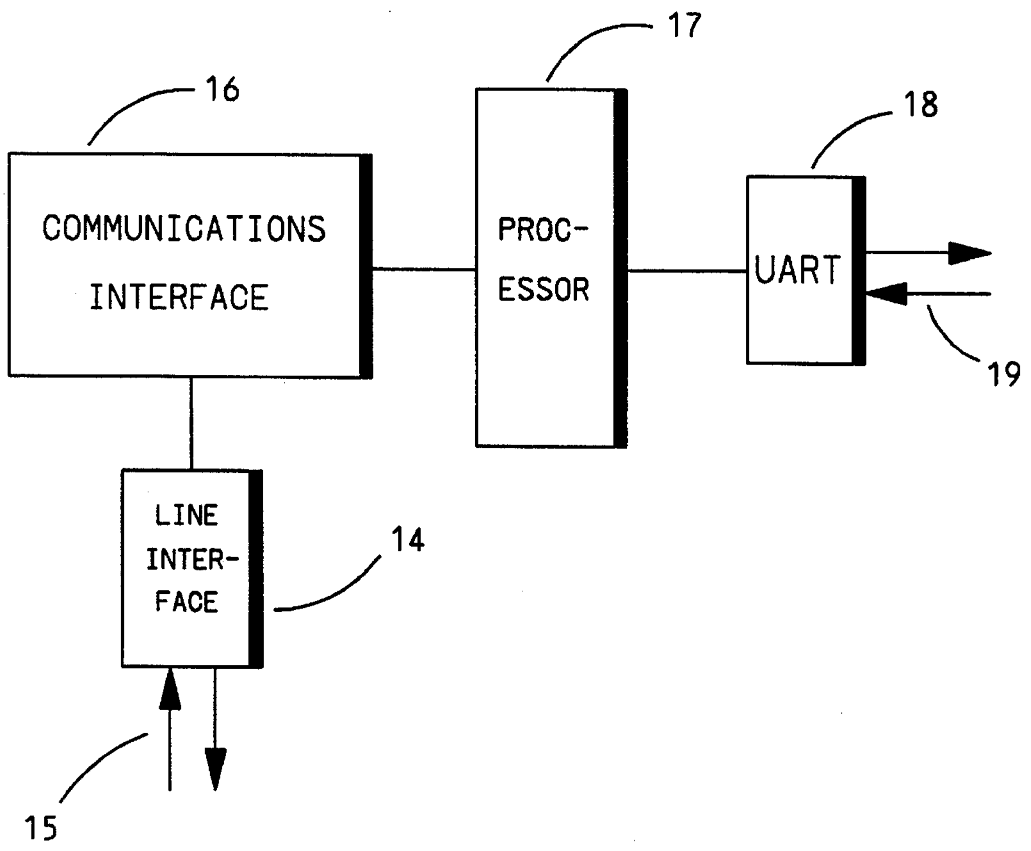
FIG. 3 is a block diagram of the central data logging node.

FIG. 3 shows the data logging node 4 (FIG. 1) in detail. The data logging node contains several physical line interfaces 14 (only one shown) with various physical lines 15 entering the unit. The line interface 14 is identical with those used in the remote units 1 with various type of building wiring. The line interfaces 14 are coupled into a communications interface 16 that is of the same type as those used in the remote units 1. However, this is the master communications interface 16 and is responsible for logically maintaining the communications network. This device 16 polls the various remote units 1 on schedule and receives their data as to ambient conditions. This data is collected and stored in the communications interface 16 and passed to a processor means 17 when requested, or the communications interface 16 can interrupt the processor means 17 when data is available.

The processor means 17 can be a simple controller such as the 80C51 made by Philips and others, or it can be any microprocessor including the 6809 manufactured by Motorola, the 80186 manufactured by Intel, or any other microprocessor. The choice of processor means 17 is governed by the tasks it will be required to perform and the compatibility desired with other existing systems, as well as the cost and amount of memory needed.

The processor 17 receives building environmental data from numerous remote locations throughout a building. It stores this data in raw form and reduces it to averages and trends. In addition, it can form part of a closed loop controller that drives equipment intended to modify the measured data parameters such as carbon dioxide, etc. The processor means 17 is capable of performing any mathematics or data manipulation necessary to provide data in a usable form and prove compliance with safety and regulatory requirements.

The processor 17 communicates with a PC or remote computer with a standard serial transmitter/receiver (UART) 18 and RS-232 port 19 as is well known in the art. The data logging node 4 may have to store data for weeks before uploading it, so sufficient memory must be provided. This can be in the form of electronic memory or disk storage.

It is to be understood that the above-described arrangements are merely illustrative of the application of the principles of the invention, and that other arrangements may be devised by those skilled in the art without departing from the spirit and scope of the invention.

We claim:

1. A building environmental compliance apparatus comprising, in combination:

at least one remote data collection point, said data collection point containing at least two environmental condition sensors, wherein said remote data collection point replaces an existing thermostat;

a data logging point communicating with at least one remote data collection point, said data logging point storing historical environmental data from remote data collection points;

a set of data polling intervals, each member of said set unique to at least one remote data collection point, whereby said data logging point stores data from remote data collection points according to said data polling intervals.

2. The building environmental compliance apparatus claimed in claim 1 wherein said remote data collection point communicates with said data logging point over existing thermostat wiring.

3. A building environmental compliance system comprising, in combination:

a first gas sensor responding to a gas selected from the group consisting of carbon monoxide, ammonia, hydrogen sulfide, and sulphur dioxide;

a second gas sensor responding to a gas selected from the group consisting of methane, and carbon dioxide;

a temperature sensor;

a humidity sensor;

a signal conditioner for controlling and conditioning signals from said sensors;

a data logger for storing historical environmental conditions;

communications means for reporting sensor values from said signal conditioner to said data logger;

data reducing means for determining trends and averages in said sensor values. incorporate the examiner's conditions for allowance and to correct claim numbering to put the claims in form to be allowed or better form for appeal.

4. The building environmental compliance system claimed in claim 3 wherein said first gas sensor is a carbon monoxide sensor.

5. The building environmental compliance system claimed in claim 3 wherein said second gas sensor is a methane sensor.

6. The building environmental compliance system claimed in claim 3 wherein said second gas sensor is a carbon dioxide sensor.

* * * * *

UNITED STATES PATENT AND TRADEMARK OFFICE

CERTIFICATE OF CORRECTION

PATENT NO. : 5,553,006
DATED : September 3, 1996
INVENTOR(S) : George Benda

It is certified that error appears in the above-identified patent and that said Letters Patent is hereby corrected as shown below:

Column 6,
Line 28, the last paragraph of Claim 3 reads:

"data reducing means for determining trends and averages in said sensor values. Incorporate the examiner's conditions for allowance and to correct claim numbering to put the claims in form to be allowed or better form for appeal."
This paragraph should read:

-- data reducing means for determining trends and averages in said sensor values --

Signed and Sealed this

Eleventh Day of June, 2002

Attest:

JAMES E. ROGAN

*Attesting Officer* *Director of the United States Patent and Trademark Office*